April 9, 1957
G. S. FISHER ET AL
2,788,083
AERATOR OUTLET
Filed April 7, 1953
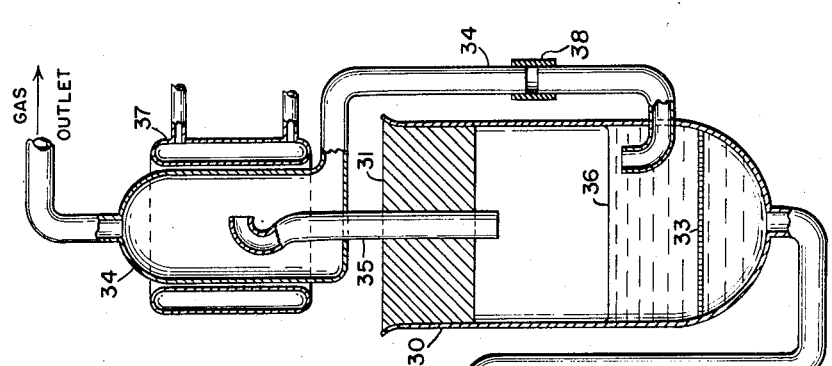
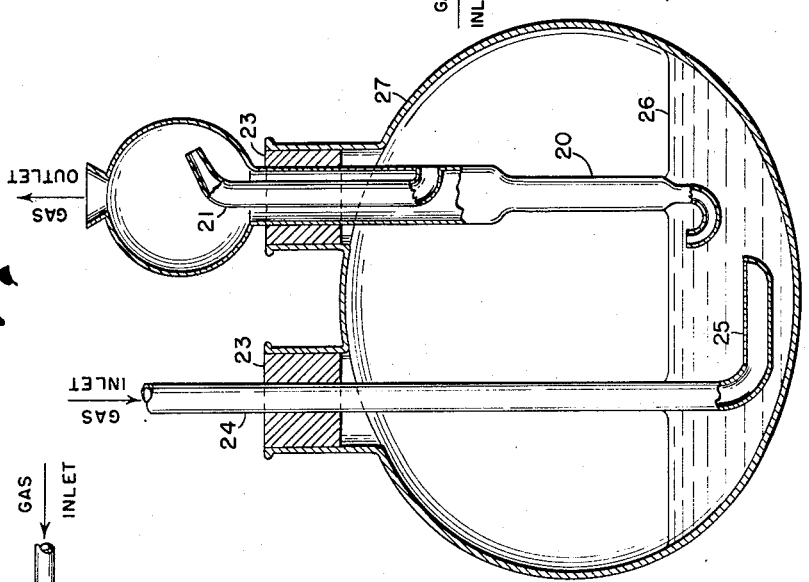
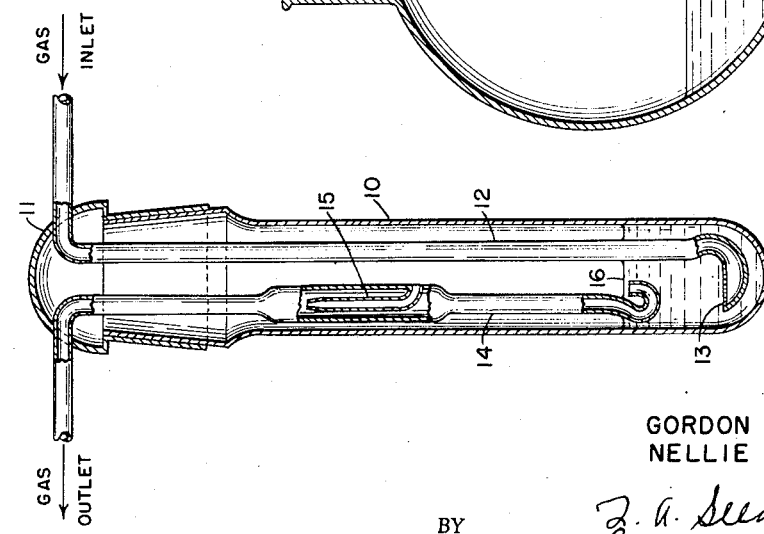
INVENTORS
GORDON S. FISHER
NELLIE J. MORRIS
BY
ATTORNEYS

# United States Patent Office 2,788,083
Patented Apr. 9, 1957

2,788,083

AERATOR OUTLET

Gordon S. Fisher, Lake City, Fla., and Nelle J. Morris, New Orleans, La., assignors to the United States of America as represented by the Secretary of Agriculture Application April 7, 1953, Serial No. 347,422

3 Claims. (Cl. 183—24)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to gas outlets for closed vessels containing a liquid being aerated. More particularly the invention provides a laboratory-scale aerator outlet which is free of moving parts and is adapted to break up relatively stable foams and prevent the escaping gas from carrying out liquid.

In general, the gas outlet for closed vessels containing liquid being aerated, provided by this invention, comprises: an upwardly extending main tube, arranged to communicate with the liquid in the vessel at its lower end and to communicate with the atmosphere outside of the vessel at its upper end, and, attached to the main tube, an upwardly extending secondary tube, arranged to communicate with the atmosphere above the liquid in the vessel at its lower end and to communicate with the atmosphere within the main tube at its upper end.

Figure 1 illustrates the outlet incorporated into an all glass aerator adapted for determinations of stability of fats and oils.

Figure 2 illustrates an embodiment of the outlet adapted for use in conjunction with a variety of laboratory scale aerators.

Figure 3 illustrates an embodiment of the outlet incorporated into an aerator adapted to subject foam to a temperature different from the temperature of the liquid being aerated.

In the embodiment illustrated in Figure 1, the aerator comprises test tube 10 closed by cover 11. Tube 12 is the gas inlet of the aerator, is provided with sintered glass gas-dispersing plate 13, and is sealed into cover 11. The gas outlet comprises main tube 14 and secondary tube 15, and is also sealed into cover 11. Tube 14 is arranged to communicate with the liquid in the aerator at its lower end and to communicate with the atmosphere outside the aerator at its upper end. Tube 15 is arranged to communicate with the atmosphere above the liquid in the aerator at its lower end and to communicate with the atmosphere within tube 13 at its upper end.

In an aeration operation, the aerator shown in Figure 1 is preferably filled with liquid to about the height indicated by line 16. The aerating gas is passed into the liquid through tube 12 and dispersing plate 13. The entry of gas into the lower end of tube 14 is preferably prevented by curving the tube upward, as is illustrated in the drawings.

Gas can be prevented from entering the lower end of the main tube of outlets provided by this invention by arranging the outlet and inlet so that the rising stream of gas bubbles does not hit the tube opening, or by the use of deflector plates or by other conventional means.

As the aerating gas leaves a liquid being aerated in the aerator shown in Figure 1, the gas and any foam it entrains moves relatively slowly through the comparatively large volume of tube 10. As the gas and entrained liquid are forced into the lower end of tube 15 by the pressure of the incoming gas, the smaller volume of tube 15 causes an increase in velocity. As the gas and foam pass from the upper end of tube 15 into the larger volume of tube 14 the change in the tube volumes causes a decrease in velocity. The changes in velocity and pressure cause the breakup of the foam. The liquid entrained by the foam returns to the body of liquid being aerated via tube 14. Since gas enters tube 14 only through the upper end of tube 15, the liquid running down tube 14 is not contacted with a moving gas and, consequently, is not re-entrained as foam within tube 14.

The secondary tubes of the outlets provided by this invention are preferably reduced in diameter at their upper ends, as is illustrated in Figure 1. While this additional diminution in the volume of passageways through which gas and any foam it entrains must pass aids in the breaking of foam, in the manner described above, for many aerating processes, the diameter of the upper end secondary tubes of the outlets can be about the same as that of the rest of the tube.

In the embodiment illustrated in Figure 2, the outlet tube is used in conjunction with a separate air-inlet tube. The aerator comprises a double-neck flask 27, to which gas inlet tube 24 and main outlet tube 20 are attached by means of resilient stoppers 23. As in the embodiment shown in previously-described Figure 1, the gas inlet tube has a dispersing plate 25 at its lower end which is submerged beneath liquid surface 26.

When the tubes are attached as shown, tube 20, the main tube of the outlet communicates with the liquid in the aerator at its lower end and communicates with the atmosphere outside of the aerator at its upper end and tube 21, the secondary tube of the outlet, communicates with the atmosphere above the liquid within the aerator at its lower end and communicates with the atmosphere within the main tube at its upper end. The outlet operates in the manner described above for the embodiment of Figure 1.

In the embodiment illustrated in Figure 3 the aerator comprises tube 30 closed by resilient stopper 31. The aerator is provided with gas inlet tube 32 and gas dispersing plate 33. The gas outlet comprises main tube 34 and secondary tube 35. Tube 34 is actually made in two sections which are joined by a short length of flexible tubing 38 to permit assembly of the apparatus.

In an aerating operation, the aerator shown in Figure 3 is preferably filled with liquid to about the height indicated by line 36. Water or steam jacket 37, or another suitable temperature controlling means, surrounding the upper portion of tube 34, provides a means of subjecting the foam entrained in the aerating gas to a temperature different from the temperature at which the liquid in the aerator is maintained. Tube 34, the main tube of the outlet, communicates with the liquid in the aerator at its lower end and communicates with the atmosphere outside the aerator at its upper end. Tube 35, the secondary tube of the outlet, communicates with the atmosphere above the liquid within the aerator at its lower end and communicates with the atmosphere within tube 34 at its upper end. The outlet depletes the exhausting gas of any liquid entrained in the form of foam in the manner described above.

Curving the upper end of the secondary tubes of the outlets provided by this invention so that the tubes discharge in a substantially horizontal direction, as is shown in Figure 3, tends to force all of the liquid, carried into the tubes as foam, to return down the main tube. This eliminates the tendency for foam to form in the secondary tubes as gas rises through them. However, the secondary tubes can discharge in substantially any direction.

Numerous chemical processes involve aeration operations. A typical example of a chemical process requiring a laboratory-scale aeration operation is the active oxygen determination of the stability of fats and oils described in Ind. and Eng. Chem., Anal. Ed., 17, 336/340, (1945), and Oil and Soap, 9, 89/97 (1932). In this method 20 gram samples of oils are aerated at 97.7° C. in 25 by 200 mm. tubes. During an investigation of the keeping qualities of peanut butter, the crude oils extracted from the products and from the raw peanuts were subjected to stability tests. When the aerator gas outlet was of the type heretofore known for laboratory scale aerators, foaming occurred to such an extent that most of the liquid was carried out of the aerator before the determination was completed. However, an all glass aerator of the type illustrated in Figure 1 (with gas dispersing plate 13 omitted and tube 14 extending below the end of tube 12, rather than being curved at its lower end, to prevent the entry of rising gas) proved to be entirely satisfactory for the operation.

In the aeration of 50 ml. samples of turpentine with 200 liters of oxygen per hour, when the aerator was provided with a gas outlet of the type described in Oil and Soap, 10, 105–109 (1933), or of the type described in ibid., 20, 169–171 (1943), in 5 minutes of aeration, the amount of liquid lost as foam was 32 and 28 ml. respectively. When the aerator was fitted with a gas outlet of the type illustrated in Figure 2, no liquid was lost as foam in either 5 or 10 minutes of aeration.

We claim:

1. An all glass aerator comprising a vessel adapted to contain a liquid to be aerated in the lower portion thereof; a gas-tight removable cover on said vessel; a pair of tubes extending through said cover and fused thereto, a first of said tubes comprising a gas inlet tube adapted to extend downward beneath the surface of the liquid to be aerated when the cover is in place on the vessel, and a second of said tubes, when the cover is in place on the vessel, being also adapted to extend downward beneath the surface of the liquid to be aerated, said second tube communicating with the atmosphere outside the vessel and cover; and a third tube extending upward within said second tube fused to a side wall of said second tube at a point between the cover and the lower end of said second tube, said third tube at its upper end communicating with the atmosphere inside the second tube and with the atmosphere within the vessel at its place of attachment to the side wall of the second tube.

2. An aerator comprising a vessel adapted to contain a liquid to be aerated in the lower portion thereof; a gastight cover on said vessel; a pair of tubes extending through said cover and attached thereto with a gastight seal, a first of said tubes comprising a gas inlet tube adapted to extend downward beneath the surface of the liquid to be aerated when the cover is in place on the vessel and a second of said tubes, when the cover is in place on the vessel, being also adapted to extend downward beneath the surface of the liquid to be aerated, said second tube communicating with the atmosphere outside the vessel and cover; and a third tube extending upward within said second tube attached to the side wall of said second tube at a point between the cover and the lower end of said second tube by means of a gastight seal, said third tube at its upper end communicating with the atmosphere inside the second tube and with the atmosphere within the vessel at its place of attachment to the side wall of the second tube.

3. An aerator comprising a vessel adapted to contain a liquid to be aerated in the lower portion thereof; a gastight cover on said vessel; a gas inlet tube extending through said cover and attached thereto with a gastight seal, said gas inlet tube being adapted to extend downward beneath the surface of the liquid to be aerated when the cover is in place on the vessel; gas outlet means comprising a first elongated tube open at both ends extending through the cover and attached thereto with a gastight seal, the upper end of said first elongated tube communicating with the atmosphere outside the vessel and the lower end of said first elongated tube being adapted to terminate immediately below the surface of the liquid in the vessel and to communicate with said liquid beneath its surface, said first elongated tube being provided with a radially expanded portion intermediate the upper and lower end, said expanded portion being provided with an opening in the side thereof, and a second tube open at both ends extending coaxially within the expanded portion of the first elongated tube, said second tube being sealed at its lower end to the opening in the expanded portion of the first elongated tube to communicate with the atmosphere within the vessel, said second tube at its upper end communicating with the atmosphere within the first elongated tube.

References Cited in the file of this patent

UNITED STATES PATENTS

| | | |
|---|---|---|
| 1,214,372 | Romberger | Jan. 30, 1917 |
| 1,457,895 | Campanella | June 5, 1923 |
| 1,889,236 | Burmeister | Nov. 29, 1932 |
| 2,353,833 | Kimmel | July 18, 1944 |
| 2,385,522 | Malott | Sept. 25, 1945 |

FOREIGN PATENTS

| | | |
|---|---|---|
| 318,621 | Great Britain | Aug. 7, 1930 |
| 541,150 | France | Apr. 28, 1922 |
| 744,657 | France | Jan. 26, 1933 |